United States Patent [19]

Maurer et al.

[11] Patent Number: 4,817,102
[45] Date of Patent: Mar. 28, 1989

[54] ACOUSTO-ELECTROMAGNETIC HOLOGISTIC RESONANT SYSTEM

[76] Inventors: Larry D. Maurer, 21316 Hawk Ridge Rd., Horton, Oreg. 97412; Michael E. Miller, Box #9, Blachly, Oreg. 97412

[21] Appl. No.: 182,836
[22] Filed: Apr. 18, 1988
[51] Int. Cl.⁴ .............................................. H01S 3/19
[52] U.S. Cl. ...................................... 372/45; 372/43; 372/101; 372/9
[58] Field of Search ...................... 372/9, 43, 45, 101; 357/1, 30 R

[56] References Cited

U.S. PATENT DOCUMENTS

| 4,349,796 | 9/1982 | Chin et al. | 357/1 |
| 4,561,005 | 12/1985 | Shannon | 357/30 R |
| 4,731,338 | 3/1988 | Ralston et al. | 372/45 |
| 4,731,789 | 3/1988 | Thornton | 372/45 |

Primary Examiner—Leon Scott, Jr.
Attorney, Agent, or Firm—Alfred E. Miller

[57] ABSTRACT

A laser is comprised of a lens, a cavity and an excitation source. The lens comprises a paraboloidically/ellipsoidally curved RF photon transparent element comprised of a periodic superlattice of laminated layers of n-doped CdS with lithium reinforcement in the valence band, a periodic superlattice of laminated layers of p-doped CdTe, and an intermediate intrinsic layer of neutral CdS. The lens is separated into three sectors of equal area tuned to emit red, green and blue light in their respective sector. The lens is mounted at one end of the cavity. The excitation is mounted within the cavity and comprises a source of an acoustic microwave beam directed toward the lens. Spiralling red, green and blue beams are produced in the lens and travel at different phase velocities to recombine to produce a single elliptically polarized white beam at one ellipse per cycle.

10 Claims, 3 Drawing Sheets

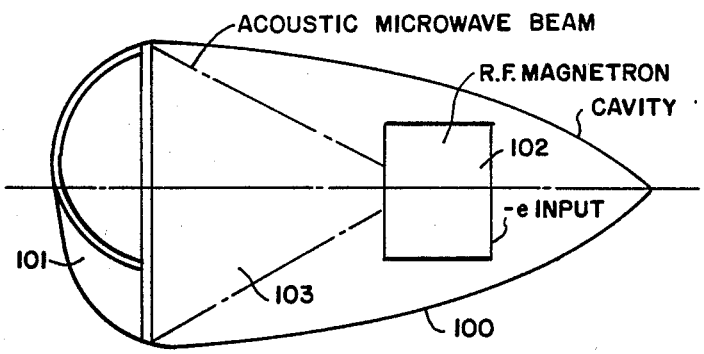
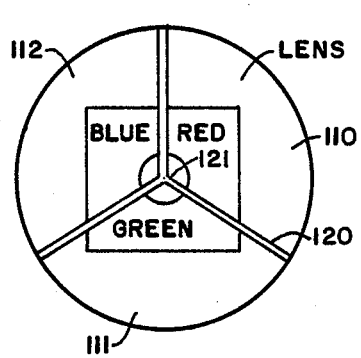
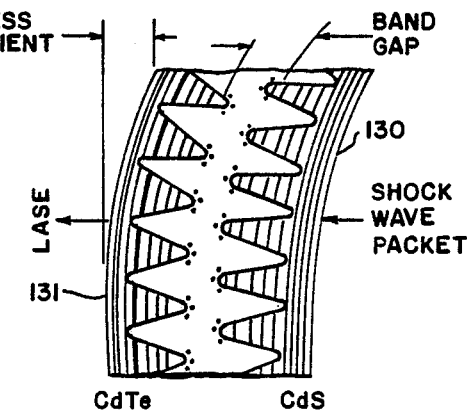
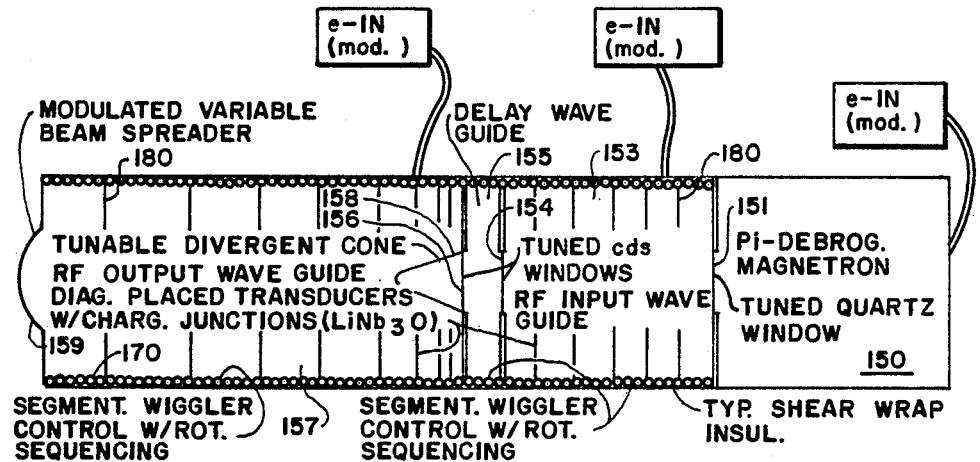

CUBOCTAHEDRON

ACOUSTO-ELECTROMAGNETIC HOLOGISTIC RESONANT SYSTEM

This invention relates to lasers, and is more in particular directed to the provision of a lasing device in the form of an acousto-electromagnetic hologistic resonant system.

SUMMARY OF THE INVENTION

Briefly stated, a laser is provided comprising a lens, a cavity and an excitation source. The lens is comprised of a paraboloidically/ellipsoidally curved RF photon transparent element comprised of a periodic superlattice of laminated layers of n-doped CdS with lithium reinforcement in the valence band, a periodic superlattice of laminated layers of p-doped CdTe, and an intermediate intrinsic layer of neutral CdS. The lens is separated into three sectors of equal area tuned to emit red, green and blue light in their respective sector. The lens is mounted at one end of the cavity. The excitation source is mounted within the cavity and comprises a source of an acoustic microwave beam directed toward the lens.

In accordance with the invention, employing this structure, spiralling red, green and blue beams are produced in the lens and travel at different phase velocities to recombine to produce a single elliptically polarized white beam at one ellipse per cycle.

BRIEF FIGURE DESCRIPTION

In order that the invention may be more clearly understood, it will now be disclosed in greater detail with reference to the accompanying drawings, wherein:

FIG. 1 is a simplified schematic illustration of a semiconducting laser in accordance with a preferred embodiment of the invention;

FIG. 2 is a front view of the lens of the semiconducting laser of FIG. 1;

FIG. 3 is a cross sectional view of a portion of the lens;

FIG. 4 is a schematic illustration of an acoustic RF projector which may be employed in the laser of FIG. 1;

DISCLOSURE OF THE PREFERRED EMBODIMENT OF THE INVENTION

Figure 5:
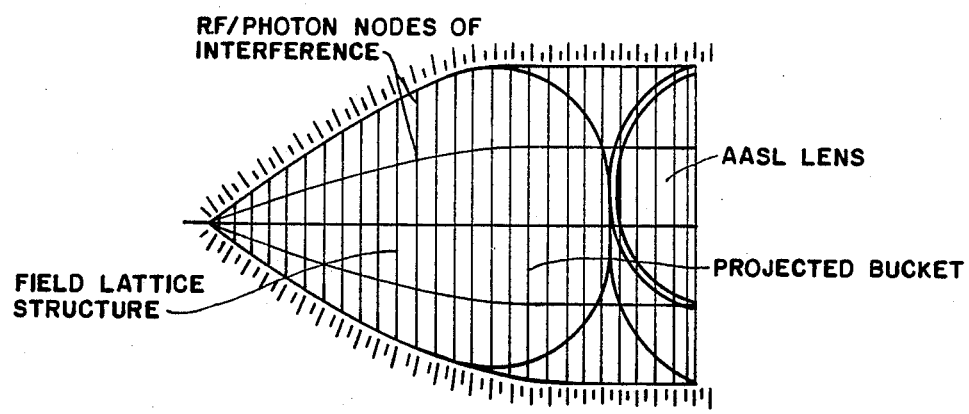
FIG. 5 illustrates the field lattice structure generated by the laser of FIG. 1.

FIG. 1 is a simplified schematic illustration of the acoustically activated semiconducting laser in accordance with the invention. The laser is comprised of a cavity 100 having an open end on which a lens 101 is mounted. Within the cavity, an RF (radio frequency) magnetron 102 directs an acoustic microwave beam 103 to the inner side of the lens 101. As illustrated in the corresponding front view of the laser, as seen in FIG. 2, the lens (and hence the cavity) is substantially circular, the lens being separated into equal 120 degree sectors, 110, 111 and 112, partitions 120 constituting an extension of the cavity extending over the junctions between the sectors 110-112 and joined at the axis 121 of the laser. As illustrated in FIG. 2, the sectors 110-112 may be designated as red, green and blue sectors.

As illustrated in FIGS. 2 and 3, the lens 101 is a paraboloidical/ellipsoidal curved RF photon transparent element, comprised of an inner periodic superlattice of laminated layers 130 of n-doped CdS with lithium reinforcement in the valence band, an outer periodic superlattice of laminated layers 131 of p-doped CdTe, and an intermediate intrinsic layer of neutral CdS. Such a superlattice, as disclosed for example in "Solid-state Superlattices", G. H. Dohler, *Scientific American*, November, 1983, pp. 144-151, and in the articles listed in the bibliography in the same publication, consists of layers of the same semiconductor doped in two different ways. In the n layers, donor atoms contribute electrons, and in the p layers acceptor atoms bind electrons. The resulting distribution of electric charge creates a set of potential wells, and the value of the effective band gap, the energy difference between the highest valence mini-band and the lowest conduction mini band, depends on the choice of dopant concentrations and of layer widths. Such a superlattice can be tuned after it is fabricated. In other words, the electrical and optical properties of the superlattice can be designed to have predetermined values, and then these values can be modulated within wide limits by a weak excitation of the crystal, for example the absorption of a low-intensity light signal or the application of a small electric current. This tunability, which differentiates doping superlattices from all other semiconductors, arises from the spacial separation between the electrons and the holes that the excitation produces.

In accordance with the invention, the three separate sectors, 110-112 of the lens are tuned to emit red, green and blue light, respectively. The tuning of the lens 101 is hence effected in accordance with conventional practice in doping superlattice structures.

The acoustic RF magnetron projector 102 produces intricately computer modulated EM (electromagnetic) pulsed, acoustic shock waves, in a variably spiralling Pi-Debroglie mode. These wave patterns are concentrated and projected onto the acoustically activated semiconductor laser lens 109, to effect the lasing.

As illustrated in FIG. 4, the acoustic RF projector 102 may be comprised of a Pi-Debroglie magnetron 150 directing its output waves through a tuned quartz window 151 into an RF input wave guide 153, thence through a tuned cadmium sulfide window 154 to a delay wave guide 155, and thence through a tuned cadmium sulfide window 156 into an RF output wave guide 157 via a tunable divergent cone 158. The acoustic waves are output from the projector by way of a modulated variable beam spreader 159. The RF input wave guide, delay wave guide and RF output wave guide are laterally defined by an insulated electrically charged conductive wire wrap 170 defining a segmented Wiggler control wrap that reinforces and controls the rotational sequencing of the projected field. As illustrated in FIG. 4, the electrically charged conductive wire shear field wrap (standard) insulates the system from external EM interference and acts as a magnetic bottle to perfectly confine all EM components to the interior of the device. Any necessary thermal insulation can be applied external to the shear field wrap.

The RF input, delay and RF output wave guides permit field modulation and compression. The computer clocked field or signal compression (i.e. radar chirped) allows more information storage capacity. The chirped acoustic shock wave packet is a propagating stress wave of variable high frequency in the optical index.

The RF input wave guide 153 and RF output wave guide 157 are provided with internal fingers 180 (lithium niobate transducers) connected to linearly accelerated charge-coupled devices, diagonally placed to reinforce the circularly spiraling (left or right hand direction) polarized standing wave patterns, with the three part equally proportioned charged (plus, 0, minus), phase space confinement zones. Precise computer clocking of the whole system is important.

The tuned cadmium sulfide windows are RF transparent to allow the flow of the continuously pulsed Pi-Debroglie mode RF signal. The variable beam spreader is also comprised of cadmium sulfide or a similar piezoelectric material.

In the following discussion, parenthetical alphabet references refer to the reference categories as indicated in Appendix A, the reference numerals listed in Appendix A referring to the specific citations given in Appendix B.

The EM variable emitter in accordance with the invention is an Acoustically Activated Semiconducting Laser (AASL) lens and utilizes both the integral and fractional Hall effects (transverse polarization dynamics and O resistivity of quantum plateaus occuring within the laminated layers of the lens) where modulated Fermionic components of the projected plasma are locally polarized in certain desired directions.

The Hall and Casimer effects acting together form an important contribution to the production of unitary wave function longitudinal states of zero conductive resistivity in the photo-excitonic plasma. Hall resistance exhibits quantized plateaus over certain intervals of magnetic field strength. In the same intervals, the resistance to current flow along the conducting layer falls to zero. Between the plateaus the Hall resistance increases as the field grows stronger.

Electrons moving in a two dimensional layer that is subjected to a strong magnetic field are confined in circular orbits in which they can assume only certain discrete energy states. The allowed states for all the electrons in the conductor, cluster in an hierarchy of energy bands. Because of imperfections in the conductor, the states making up each band are not precisely equal in energy. In the presence of impurities some electrons are trapped in "localized states" with a slightly lower or higher energy than the "extended states" at the center of each band, in which electrons are free to move about the conductor.

Raising the magnetic field strength increases the number of states within each energy band. The kinetic energy of the electrons is small and assumes the lowest unoccupied states. Electrons flow into lower bands and the Fermi level (the energy level of the most energetic electrons) falls.

If the Fermi level lies within a region of localized states at the upper or lower edge of a band, the number of electrons occupying the extended states is therefore capable of contributing to the Hall effect and does not change. Thus, the Hall resistance exhibits a plateau.

When the Fermi level descends to the center of the band and electrons begin to vacate the extended states, the number of electrons available for conduction decreases and the Hall resistance begins to climb again. The Hall resistance at the plateau is determined by an integer and two fundamental constants of quantum mechanics: the charge of the electron and Planck's constant.

At the plateaus the most energetic electrons are trapped by impurities. As a result the flow of current can take place only among electrons in the filled extended states of lower energy bands. Under such circumstances the current flows without dissipating energy, and the resistance along the conductor drops to zero.

The quantized Hall effect is independent of the crystal geometry of the conductor and the number of kinds of impurities. This effect is discussed, for example, in "The Quantized Hall Effect", B. T. Halperin, Scientific American, November 1986, pp 52-60 and in the bibliography on page 124 thereof. The values of the Hall resistance at the plateaus deviate from perfect quantization by less than one part in six million. The high precision of the effect makes it useful as a standard of electrical resistance and a means of assigning more precise values to quantum mechanical constants. The Casimer effect helps generate a stabilizing longitudinal attractive force among transverse beam components and the device. One aspect of this force associated with the zero point vacuum expectation energy is independent of temperature.

The three part, paraboloidically/ellipsoidally curved, RF photon transparent AASL lens is a specifically tuned and structured, compositional, periodic superlattice of miniband/gap laminated layers of N-doped CdS (wurtzite) with lithium reinforcement in the valence band, neutral CdS in the intrinsic, or photon energy gap, and P-doped CdTe (wurtzite) in the conduction band (C).

The three equal part AASL lens composed of these piezoelectric/semiconducting crystals in the ground state are tuned to emit red, blue, and green light in their respective sections which are also separately polarized. Normally, CdS emits green light, but through superlattice tuning techniques, the different sectors of the crystal lens are also tuned to emit red and blue light.

The three part lens produces three separately modulated polarized diamagnetic bi-excitonic gases that are initially confined in a specifically ordered fashion of pattern integrities of specific motion in the Brillouin Zone (Houstons, W. V., Phys. Rev. 57, 184, 1940) within the laminated "mini-band" layers (for phonon control).

The diamagnetic bi-excitons are produced within the AASL lens and interact with the kinetic, thermal and polarization vibrations of the AASL crystal lens.

The mass operator is effectively renormalized on the excitons and the diffraction properties of the AASL lens superlattice structure creates defects to permit an ordered flow of diffracted dielectric permittivity waves in the crystal so as to scatter the desired (North) polarized diamagnetic bi-excitons to couple to an external acoustic shock wave (Mahan, Secondary Cone Emission, Phys. Rev. B2, 4334, 1970). This acoustic shock wave is produced from a pulsed computer clocked solid state phase locked Pi-deBroglie mode RF magnetron (maser) within the cavity. This RF signal wave packet is first compressed ("chirped") (IEEE Transactions, Special Issue on Biological Effects of Microwaves, IEEE Transactions on Microwave Theory and Techniques, Vol. MTT-19, No. 2, pp. 128-247, February, 1971; Joint Technical Advisory Committee, Spectrum Engineering—The Key to Progress, Joint Technical Advisory Committee, IEEE, Supplement 3, 1968; Microwave Journal, Microwave Acoustics, Microwave Journal, Vol. 13, No. 3, March, 1970; Microwave Theory, Special Issue on Microwave Acoustics, IEEE Transactions on Microwave Theory and Techniques, Vol. MTT-17, No. 11, November, 1969; White, R. M., Surface Elastic Waves, Proceedings of the IEEE, Vol. 58, No. 8, pp. 1238-1276, August, 1970) and then focused on the AASL lens with the maser.

The chirped acoustic shock wave packet is a propagating stress wave of variable high frequency in the optical index (D). The AASL lens is tuned to allow specific perturbated stress points that are directed toward defect points (Frenkel defects with cations and anions) (C).

The acoustic shock wave pops out into a point-like shape due to photon acceleration (Grishin, Shock Waves Excited by a Relativistic, Charged Beam in Media with Dissipation, Vestnik Moskovskogo Universiteta Fizika, Volume 38, Number 3, pp. 18-22, 1983) producing the leading edge where hologistic photon-logic patterns are impressed (Karamzin, Sukhorukovn and Trofimov, Optimal Control of the Wave Front and Temporal Profile of Optical Radiation Propagating in Non-linear Medium, Vestnik Moskovskogo Universiteta Fizika, Volume 37, Number 4, pp. 18-21, 1982). The RF constituents close off the lateral and trailing edge trapping the three separately polarized and charged diamagnetic bi-excitonic gases in between the leading edge and the trailing edge that is produced by pulsing the field, that in turn produces the projected potential EM wells or buckets. The three separate red, blue, green spiralling beams that are produced by the AASL lens of the invention travel at different phase velocities and recombine to give an elliptically polarized beam at one ellipse per cycle (optical electrical field vector).(E)

The AASL lens employs the equilaterally triangular arrayed superlattice in its acoustooptical design because a superlattice is effectively an active element of an electromagnetic (EM) wave generator.(C) Doping produces a permanent population of electrons or holes by introducing impurity atoms into the semiconductor structure.(C)

Polarized diamagnetic bi-excitonic gas becomes very dense when confined in the projected buckets as well as in the energy gaps which are themselves potential wells (A, B). The confined oscillating bi-excitonic gas particles (bosons) form a Bose-Einstein condensate with their particle spins aligned, generating a fiber bundle packet with parallel transport within the projected buckets, as seen in FIG. 5.(B)

The point-like projected bucket begins to take on monopolar or particulate general vector potential (GVP) both in dynamics and harmonics with the faster moving excitonic particles confined in the relatively slower moving projected buckets.

Figure 6:
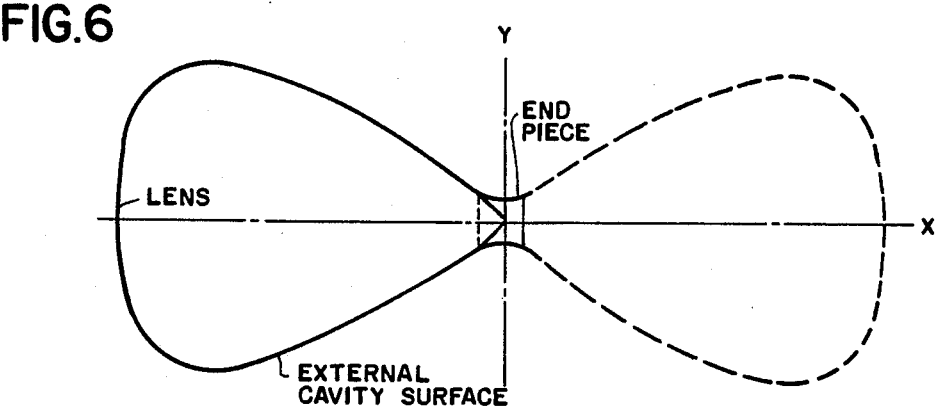
FIG. 6 is a simplified illustration of the preferred cavity shape for the laser.

As seen in FIG. 6, the digital finger array is geometrically placed for the optimum ponderomotive phase space (potential well) confinement representation of the zero degree angular excess cap and cone topology (Aharonov and Bohm, Significance of the Electromagnetic Potential in the Quantum Theory, Phys. Rev., Vol. 5, Number 7, August 1959. The works of Bernstein and Phillips, R. Y., Chiao and Y. S. Wu, Manifestations of Berry's Topological Phase for the Photon, Phys. Rev. Lett. Vol. 57, 933, 1986, etc.). The fingers in the RF signal compression chamber that are an active part of the RF magnetron acoustic shock wave projector are connected to linearly accelerated charge-coupled devices, diagonally placed to reinforce the circularly spiralling (left or right hand direction), polarized, standing wave pattern with the three part, equally proportioned, integrally or fractionally charged (+, 0, −), phase space confinement zones.(J)

The precise external shape of the entire device may be defined and generated by the Basic computer program presented below:

```
below:
f( 1 )= .9
f( 2 )= 1.570795
f( 3 )= .13
f( 4 )= 0
f( 5 )= .5
f( 6 )= .44
f( 7 )= .04
dim f(10)
for n= 1 to 20
key(n) on
next n
on key (1) gosub f1
on key (2) gosub f2
on key (3) gosub f3
on key (4) gosub f4
on key (5) gosub f5
on key (6) gosub f6
on key (7) gosub f7
on key (8) gosub f8
on key (10) gosub clr
on key (9) gosub prtall
on key (11) gosub up
on key (14) gosub down
screen 2
window (−1,−1,)−(1,1)
gosub clr
PI=3.14159
f(2)=PI/2
f(4)=0
f(1)=.90
f(3)=.13
f(5)=.50
f(6)=.44:rem .43
f(7)=.04:rem .03
gosub prtall
again: FOR T=0 TO 2*PI STEP .01
X=f(1)*sin(T+f(2))+f(3)*(cos(3*T+f(4)))−f(7)*(cos(5*T+f(4)))
Y=f(5)*sin(T+f(4))+f(6)*(sin(3*T+f(4)))
PSET (X,Y)
rem PSET (.05*T−1,Y)
rem PSET (X,.05*T−1.2)
Next T
goto again
f1: s=1:return
f2: s=2:return
f3: s=3:return
f4: s=4:return
f5: s=5:return
f6: s=6:return
f7: s=7:return
f8: s=8:return
down: f(s)=f(s)−.01:gosub clr:ss=s:gosub prt:gosub prtval:return
up: f(s)=f(s)+.01:gosub clr:ss=s:gosub prt:return
clr:cls
locate 1,1:print "X=f(1)*sin(T+f(2))+f(3)*(cos(3*T+f(4)))−
   f(7))*(cos(5*T+f(4)))";
locate 2,1:print "Y=f5*sin(T+f4)+f6*(sin(3*T+f4))";
line (o,−1.5)−(0,1.5)
line (−1,0)−(1,0)
return
prt: lprint "f(";ss;")=";f(ss):return
prtall: for ss=1 to 7:gosub prt:next ss:return
```

```
-continued
prtval:locate 3,1:print "f(";ss;")=";f(ss);:return
```

This program constitutes only a basic description and can be redefined to create exact dimensions.

This program is a continuous harmonic function that parametrizes the geometry of the device in a smooth manner. The three external geometric curvature relationships defined continuously with a smooth transition from one to another by this computer program are:
1. Lens-Paraboloidical/Ellipsoidal
2. External Cavity Surface- A cubical curve related to electromagnetic interactions with the zero point vacuum expectation energy.
3. The Anti-Cavitation End Piece- Hyperboloidical The longitudinal (horizontal) "x" axis of this program represents the "z" axis used in all real applications.

This program generates a tranversely mirror symmetrical pair (FIG. 6), that is also radially symmetrical with respect to the longitudinal axis.

The anti-cavitation end piece structure may change slightly in accordance with the size of the device as to prevent cavitation.

The cut-off plane defining the longitudinal projection (length) of the end piece is shown here to be located at an equal distance from the waist (circle of minimum diameter, passing through the origin) as is the circle of tangency defining the smooth transition from hyperboloidical (end piece) to cubic (external cavity surface) curvature.

The cut off plane is perpendicular to the longitudinal axis; the plane's intersection with the device's geometry being circular. Any and all planes perpendicular to the longitudinal axis intersect the device's shape in circular cross sections, the device being radially symmetrical with respect to the longitudinal axis.

For certain applications, not requiring the end section, the cubic curve may be continued until the longitudinal axis is met and then terminated.

Certain applications of the specifically shaped exterior cavity as described by the program given above will require the external cavity and end piece to be constructed of an exteriorly charged superconductive laminate of doped, periodically arrayed mini-band layers of different metals such as indium, niobium, aluminum, copper, etc., on a titanium-steel substrate. For these applications, the lens will remain exactly as described herein.

Figure 7:
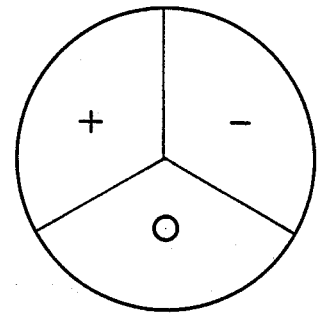
FIG. 7 illustrates the pi-mode spoke patterns of the EM pulsed, two-dimensionally curved acoustic shock wave.

The chirped RF signal shock wave packet is spread out in a paraboloidically curved "two dimensional pancake" and focused directly in front of the AASL lens. As illustrated in FIG. 7, the Pi-mode "spoke" patterns of this EM pulsed two-dimensionally curved acoustic shock wave are phase locked with the three exterior charged support bars at 120 degrees apart, in the AASL lens, so that the negative one third phase space is matched to the red portion, neutral one third [($\frac{1}{3}\times(-\frac{1}{3})$)=fractional neutral bound state "exciton"] to the green portion and the $+\frac{1}{3}$ to the blue portion of the lens.

The parameters of the projected sinusoidal, interiorly resonating compressed field, are set up by the distribution of RF components in precisely clocked phase relationships accomplished by computer modulation which also controls the overall field amplitude.

The projected, pulsed and modulated shock wave, with discreet input angle and harmonics, produces and modulates the coherent light, or lasing activation, from the lens, with its topologically consistant paraboloidically curved surface, in a manner similar to the operation of a three part (cleave coupled) spherical, one third red, one third blue, one third green, semiconducting laser (Allen, et. al., Single Frequency Injection Laser Diodes for Integrated Optics and Fiber Optics Applications, Proceedings of the Society of Photo-Optical Instrumentation Engineers, Vol. 157, pp. 110–117, 1978; Coldren, et. al., Monolithic Two-Section GaInAsP/InP Active-Optical-Resonator Devices Formed by Reactive Ion Etching, Applied Physics Letters, Vol. 38, No. 5, pp. 315–317, Mar. 1, 1981.; Tsang, W. T., et. al., High Speed Direct Single-Frequency Modulation with Large Tuning Rate and Frequency Excursion in Cleaved-Coupled-Cavity Semiconductor Lasers, Applied Physics Letters; Vol. 42, No. 8, pp. 650–652, Apr. 15, 1983).

As shown in FIG. 7, the chirped acoustic shock wave packet is an interactive resonant cavity that confines a static e- charge that has been accelerated to create a relativistic "B" field (momentum transfer) (Bjorlken and Drell, Relativistic Quantum Mechanics, McGraw Hill, New York, 1964; Electromagnetic Fields and Interactions, Blazedell Publishing Co., Walston, Mass., 1964; Jackson, Electrodynamics, Wiley, N.Y., 1963, p. 465; Messiah, A., Quantum Mechanics, 20, Interscience Inc., New York (1961)).

The B field acts to restore gauge invariance, as the symmetry was broken when the charge was accelerated or broadcast. With field confinement focusing techniques in the AASL system, wave guides are not required.

The chirped and broadcast shock wave packets are pressure waves traveling through the RF/photon transparent AASL lens producing a propagating stress wave, which is a propagating wave of perturbation in the optical index allowing the controlled production of intermediate boson states through the refractive confinement of radiation signals.(I)

The compressed, short wave length frequencies in the acoustic shock wave, create the proper velocity distributions (Pushpahasan, A., and Vishwanathan, K. S., Focusing and Defocusing of Ballistic Phonons in Diamond and $Nb_3Sn$, Pramana, Vol. 24, No. 6, pages 875–886, June 1985) of excitons and other quasi-particles (polarons, magnons, etc.), as the range of emitted or broadcast frequencies determines the distribution of kinetic energies (Balakshii, et. al., Acousto-optical Interaction of Banded Wave Beams, Moscow University, Volume 37, Number 5, 1982; Balakshii, Frequency Characteristics of Acousto-Optical Light Modulators, Vestnik Moskovskogo Universiteta Fizika, Volume 37, Number 1, pp. 33–49, 1982; Balakshii and Upasena, Acousto-Optical Interaction of Bounded Wave Beams, Vestnik Moskovskogo Universiteta Fizika, Volume 37, Number 5, pp. 71–76, 1982; Khaliov, Resonant Transitional Scattering in Vacuum in the Presence of an External Electromagnetic Field, Vestnik Moskovskogo Universiteta Fizika, Volume 38, Number 1, pp. 88–90, 1983; Parygin and Tankovski, The Fraction of the Surface Light Wave in a Planar Surface-Acoustic-Wave Light Guide, Vestnik Moskovskogo Universiteta Fizika, Volume 37, Number 6, pp. 48–52, 1982).

The individual red, blue, and green signals recombine to form one signal.

This three part signal that renormalizes to form the overall color of white, as in a hadron string (Ansourian, Rotational Covariance in the Yang Mills Monopole, Physical Review D, Volume 14, Number 10, 15 November 1976; Bogomol'nye, Yad. Fiz., 24 861 (1966); Boulware, Phys. Rev. D, 14, Number 10, 2709, (Nov. 15, 1976); Boulware, et. al., Scattering On Magnetic Charge, Physical Review D, Volume 14, Number 10, Nov. 15, 1976; Dirac, Proceedings of the Royal Society of London, A209, 291 (1951); Dirac, The Theory of Magnetic Poles, Physical Review, Volume 74, Number 7, October, 1948; LaRue, et. al., Evidence for the Existence of Fractional Charge on Matter, Physical Review Letters, Volume 38, Number 18, May 2, 1977; LaRue, et. al., Observation of Fractional Charge of One-Third On Matter, Physical Review Letters, Volume 46, Number 15, Apr. 13, 1981; LaRue, G. S., Ph.D. Thesis, Stanford University, 1978, unpublished; LaRue, Fairbank and Hebaird, Phys. Rev. Let., 38, 1011 (1977); LaRue, Fairbank and Phillips, Phys. Rev. Let., 42, 142, 1019(E) (1979); LaRue, Phillips and Fairbanks, Proceedings of the 20th International Conference in High Energy Physics, Madison, Wis., July, 1980, to be published), is formed to mimic the non-abelian microscopic structure of hadron hyperfine splitting and the Zeeman effect, on a macroscopic level. Normally, the separate red, blue, and green lasers have different wavelengths, but, combined in this fashion, give one signal which does not blur or distort over macroscopic distances and is three phase (Allen, et. al., Single Frequency Injection Laser Diodes for Integrated Optics and Fiber Optics Applications, Proceedings of the Society of Photo-Optical Instrumentation Engineers, Vol. 157, pp. 110-117, 1978; Coldren, et. al., Monolithic Two-Section GaInAsP/InP Active-Optical-Resonator Devices Formed by Reactive Ion Etching, Applied Physics Letters, Vol. 38, No. 5, pp. 315-317, Mar. 1, 1981; Tsang, W. T., et. al., High Speed Direct Single-Frequency Modulation with Large Tuning Rate and Frequency Excursion in Cleaved-Coupled-Cavity Semiconductor Lasers, Applied Physics Letters; Vol. 42, No. 8, pp. 650-652, Apr. 15, 1983).

The AASL lens effectively becomes the hadron face (Nielsen, et. al., Nuc. Phys. B, 195, 136 (1982); Nielsen, et. al., Vortex Line Models for Relativistic Strings, Nuclear Physics B61, 1973, pp. 45-61; Nielsen and Olsen, Nuclear Physics B, 61, 45 (1973); Nielsen and Olsen, Nuclear Physics B61, 45 (1973); O'Raifeartaigh, et. al., Magnetic Monopole Interactions, Physical Review D, Volume 20, Number 8, Oct. 15, 1979; O'Raifeartaigh and Wali, Phys. Rev. D, 15, 3641 (1977); Polyakov, Am, JETP, 20, A, 194 (1974); Polyakov, Fiz., 2, Volume 24(1): 83, Geiger and Sheeya; Rev. of Mod. Phys., 13, 203 (1941); Polyakov, JETP, 20, 194 (1974); Polyakov, Nuc. Phy. B120, 429 (1977); Polyakov, The works of; Polyakov, et. al., Phys. Let., 59B, 85 (1975); Polyakov, Zh. Eksp. Teor. Fiz. Pis'ma Red., 20, 430 (1974); Steenrod, Published works on topology and fiber bundles; Steenrod, The Topology of Fiber Bundles, Princeton University Press, Princeton, N.J., 1951; Susskind, Dual-symmetric Theory of Hadrons/Mesons, Nuovo Cimento, Volume LXIX, Number 3, Oct. 1, 1970; 'tHooft, G., Confinement in Topology in Non-abelian Gauge Theory, Proceedings of the 19th International University Physics Conference, Schaldming, Germany, Feb. 20- Mar. 1, 1980; 'tHooft, G., Nuclear Physics B, 35, 167 (1971); 'tHooft, G., Nuclear Physics B, 79, 276 (1974); 'tHooft, G., Planar Diagram Theory for Strong Interactions, Nucl. Phys., B72, (1974), pp. 461-473; 'tHooft, G., Phys. Rev. Let., 37, 8 (1976); 'tHooft, G., Renormalization of Massless Yang Mills Fields, Nuclear Physics B33, 1971, pp. 173-199; 'tHooft, G., Renormalized Lagrangins for Massive Yang Mills Fields, Nuclear Physics B35, 1971, pp. 167-188; 'tHooft, G., The Topological Mechanism for Permanent Quark Confinement in a Non-abelian Gauge Theory, Physica Scripta, 1981; Tkach, The works of, (published and unpublished); Wilson, Confinement of Quarks, Physical Review B, Volume 10, Number 8, (Oct. 15, 1974); Wilson, Phys. Rev., 75, 309 (1949); Wilson, Phys. Rev. D, 10, 2445 (1974); Wilson and Kogu, Phys. Reports, 12C, 75 (1974); 620. Witten, Dyons of Charge eO/2 , Physics Letters, Volume 86B, Number 3,4, 8 October 1979; Witten, Phys. Rev. Let., 38, 121 (1977); Wu and Wu, Journal of Mathematical Physics, 15, 53 (1974); Wu and Yang, Concept of Non-integrable Phase Factors in Global Formulation of Gauge Fields, Physical Review D, Volume 12, Number 12, Dec. 15, 1975; Wu and Yang, concerning maintenance of dyon permutation symmetry etc., Phys. Rev. D, 12, 3845 (1975); Wu and Yang, Nuclear Physics B, 107. 365 (1976); Wu and Yang, Properties of Matter Under Unusual Conditions, edited by Mark, Interscience, New York, 1960, pp. 349-354; Wu and Yang, Properties of Matter Under Unusual Conditions, Interscience, edited by Mark and Fernbach, Interscience, New York, 1969; Wu and Yang, Sme Remarks About Unquantized Non-abelian Gauge Fields, Physical Review D, Volume 12, Number 12, Dec. 15, 1975; Yang, CN, Magnetic Monopoles Fiber Bundles and Gauge Fields, Annals of the New York Academy of Sciences; Yang, Phys. Rev. D, 1, 2360 (1970); Yang, Phys. Rev. Let., 33, 445 (1974); Yang, Proceedings of the Sixth Hawaii Tropical Conference in Particle Physics, 1975; Yang and Mills, Phys. Rev., 95, 631 (1954); Yang and Mills, Phys. Rev. 96, 191 (1954)) that generates the color-EM squared buckets in an acousto-activated computer clocked manner to produce left-handed Larmor precession, mimicking the rotation of frustrated overlapping wave sections of closed Wilson loop plaquettes in a hadron string; (Steenrod, The Topology of Fiber Bundles, Princeton University Press, Princeton, N.J., 1951; Sugawara, Theory of Quark Confinement Based on an Analogy with a Theory of Magnetic Monopoles, Physical Review D, Volume 14, Number 10, Nov. 15, 1976; 'tHooft, G., Confinement in Topology in No-abelian Gauge Theory, Proceedings of the 19th International University Physics Conference, Schaldming, Germany, Feb. 20-Mar. 1, 1980; Weyl, Physics, 56, 330 (1929); Weyl, Raum, Zeitumdundmateri, 3, Springer-Verlag Berlin, Heidelburg and Nork, 1920; Weyl, Sitzberperussakadwiss, 465; Math. Z. 2, 348 (1918); Ann. Phys., 59, 101 (1919); Weyl, Space Time and Matter, Dover Publications, New York, N.Y., 1921).

High frequency harmonics create electrooptical effects such as the magnetooptical Faraday polarized states of photons (three part overlapping integrity pattern); clocking controls the Larmor precession in odd-numbered precessing "frustrations" (half twists). These half twists connect electric (three parts) and magnetic (three parts) fields through the six tensor GVP shape of the projected buckets.

The doped, compositional, periodic superlattice of RF/photon transparent, separately tuned mini-bands in the AASL lens is laminated to form the curved ellipsoidal/paraboloidical shape. The alternating layers are varied from one (atomic) dimension to over twenty four N+1 (N-dimensional Leech lattice) layers representing the next atomic layers or dimension.

The alternating, semiconducting/piezoelectric crystal layers are basically valence, conduction and energy band gaps tuned to emit red, blue, and green photons. The paraboloidical curve in the laminated crystal lens provides a stress energy gradient producing a change in energy of the excitons per unit distance, and is a motive force on the excitons.

The periodic alternation of semiconducting layers produces a related periodic alternation in electric potential. Each mini-band represents a quantized energy state which is split into a quasi-continuum where each individual atom creates a potential well.

The AASL superlattice lens poses as a large resistor that increases the voltage and feeds energy into the projected buckets. The periodically arrayed P-N junctions with associated quasi-continuum effects, break down the excitonic oscillating level to the atomic structure of the host/receiving crystal layers.

The oscillation occurs between the upper and lower edge of the mini-bands. The exciton takes over the role of the hydrogen atom with the exception that excitons have five times the mobility. Also, excitons and free charge carriers have a possible lifetime of hours rather than a billionth of a second.(A)

The laminated lens provides a nuclear gradient of bonding energy levels. The energy levels available to electrons can be tailored to the appropriate choice of semiconductors and by the width of their layers. The atomic structure of the laminated lens, of course, has the triangular lattice array of holes that are alternating and overlapped to form a hexagonal (expanded sphere) dense pack Leech lattice in comparison to the total overlap of the mini-bands and holes (C).

CdS and CdTe are suitable materials for the AASL lens, for the following reasons:
1. The atomic structure of CdS is naturally hexagonal (wurtzite) and is a piezoelectric semiconductor that allows the propagation of longitudinal EM waves.
2. Sound waves pass through the CdS crystal rather than across the surface as in all other semiconductors.
3. CdS is RF and photon transparent.
4. CdS structure has thirty-six loosely bound electrons per unit cell and has wide S-P3 valence bands.
5. CdS and CdTe provide a sharp increase in diamagnetism and are anisotropic (the three separate ⅓ AASL lens sections are individually anisotropic but together make the AASL lens a variable isotropic EM emitter).
6. CdS is a tetrahedrally coordinated structure where the unit cell contains four atoms. This resulting doubling of the number of states in the valence band, the lower hexagonal lattice, the higher ionicity and the presence of d-bands within the valence bands, all contribute to the electronic structure of CdS.
7. CdS transmits more frequencies of light than other semiconductors.
8. CdS is basically N-doped only, whereas a P-type of CdTe can be obtained by Ga or Ag (Sb) doping.
9. Bi-excitons have been detected in Si, GaS and CdS.
10. Transportation of Cd interstitial atoms (cadmium atoms in interstitial transition) within the CdS internal lattice structure causes 0 luminescence bands.

Figure 8:
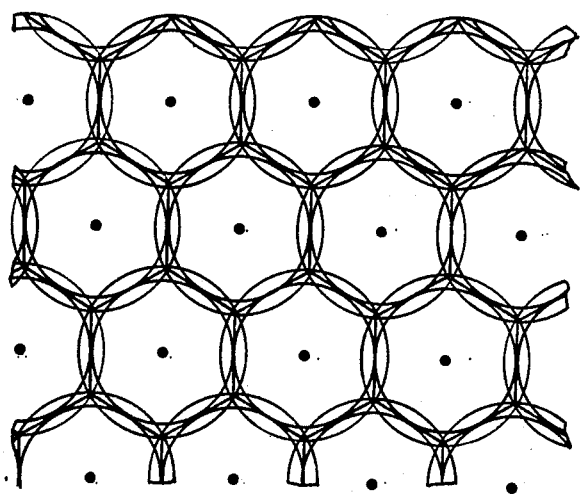
FIG. 8 illustrates the packing of the atomic planes of the AASL lens.

The laminated bands of the AASL lens form a tetrahedrally coordinated plane or array of parallel atomic planes composed of a hex-pac of overlapping 120 degree unit simple cell parallelopipeds (or two 60 degree mirror symmetric triangular prism cells) which is computer coordinated as a charge data point, as illustrated in FIG. 8.

Neutral cadmium is used in the intrinsic layer which has a macroscopic resistor-transistor effect on the overall transmission of energy.

The real part of the band dispersions is also substantially modified by the inclusion of the damping term in the crystal lens potential. Damping causes localizations of the final states, effectively preventing long range interference.

The initial state wave vector can be determined to lie in certain lines in reciprocal space that are normal to the crystal lens surface which is ellipsoidal/paraboloidical (paraboloidical in most free electron materials).

Initial states that are even (odd) with respect to the mirror plane will be excited when the electric field E vector of incident photons is parallel (perpendicular) to this plane (Bambini and Stenholm, Unification of Free Electron Laser Theories, Optica Acta, 1980, 27, Number 2; Didenko and Kozhevnikov, Free Electron Lasers and Their Possible Applications, Ixvestiya Vysshikh Echebnykh Zavebnii, Fizika, No. 3, pp. 1225, March, 1983; Rashba, Optical Spectrophysics, 2, 88 (1957)). The bulk and surface reciprocal lattice vectors (for both surfaces) along the hexagonal axis are of equal length. The scattering caused by the periodic array (superlattice) in the AASL lens can be related to the dispersion law and is a quasi, two-dimensional phonon system (Dereli, et. al., Phys. Rev. D, 12, 1096 (1975); Granatstein, et. al., Phys. Rev. A, 14, 1194 (1976)).

Three sequentially distinct events occur in the AASL lens when lasing occurs:
1. Wave vector conserving initial optical phonon excitation by the acoustic shock wave packet.
2. Transport of the excited electron to the lens surface.
3. Transmission of the photo-electron through the lens surface to attach to the acousto-shock wave in specific, variable, computer controlled patterns.

The lasing threshold is met when the RF pulsed photons traverse the gaps without alternation (as in a Fabry-Perot cavity).

The holes recombine and lase in a specific pattern (Danilov, The Structure of a Shock Wave in a Magnetized Plasma, Vestnik Moskovskogo Universiteta Fizika, Volume 37, Number 1, pp. 108–110, 1982; Grishin, Shock Waves Excited by a Relativistic, Charged Beam in Media with Dissipation, Vestnik Moskovskogo Universiteta Fizika, Volume 38, Number 3, pp. 18–22, 1983) controlled by the RF acoustic shock wave packet.

The pressure exerted as tension on the crystal by the acoustic wave packet forces the excitons to attach to the shock wave that slows down the photons (Danilov, The Structure of a Shock Wave in a Magnetized Plasma, Vestnik Moskovskogo Universiteta Fizika, Volume 37, Number 1, pp. 108–110, 1982; Grishin, Shock Waves Excited by a Relativistic, Charged Beam in Media with Dissipation, Vestnik Moskovskogo Universiteta Fizika, Volume 38, Number 3, pp. 1814 22, 1983) so that charge/vibrational transference of information goes from the quasi-level, or phase-space oriented oscillating gas of polarized diamagnetic excitons, to the AASL produced, coherent photon wave.

The leading edge of the photon shock wave packet is where hologistic photon charge-logic patterns (laser interferometry research-Bell Labs) transfer information on a macroscopic level. The excitonic gas jumps or is moved by the "wind" of acoustic pressure (phonons) to the next gap (Mahan, Phys. Rev. B2, pg. 4334, 1970) in front of the lens and behind the shock wave. Under EM pulsing the RF components of the shock wave envelope the lateral portions of the projected bucket closing off to a paraboloidically curved shape in an inverse or mirror image (GVP) shape (B). The projected beam lattice spacings have the same geometrical substructure and spacing coefficients as the AASL lens.

This point-like "bubble", with momentum, is a bucket that confines the oscillating coherent polarized diamagnetic excitonic gas by the triangular lattice of RF/photon nodes of incidence in a constructive/destructive interference mode (Bambini and Stenholm, Unification of Free Electron Laser Theories, Optica Acta, 1980, 27, Number 2; Didenko and Kozhevnikov, Free Electron Lasers and Their Possible Applications, Ixvestiya Vysshikh Echebnykh Zavebnii, Fizika, No. 3, pp. 1225, March, 1983), for the ideal node spacing, to deflect and confine quasi-particles in the topology of the EM-GVP (bucket) cavity. The confinement within the projected buckets of the excitonic gas causes density by Bragg refraction, causing Bloch oscillation of these fast moving quasi-particles.

The individual $\frac{1}{3}$ red, blue and green laminated crystal sections in the lens can be tuned to produce "color" (color means non-abelian coded). The lifetime of the confined oscillating particle (boson) charges lasts for several hours rather than decaying in billionths of a second. The color-EM squared buckets are ponderomotive phase-spaces (Bambini and Stenholm, Unification of Free Electron Laser Theories, Optica Acta, 1980, 27, Number 2; Didenko and Kozhevnikov, Free Electron Lasers and Their Possible Applications, Ixvestiya Vysshikh Echebnykh Zavebnii, Fizika, No. 3, pp. 1225, March, 1983) of extremely dense (hydrogenic) nuclear structure with a vacuum expectation charge value.

The fabrication of the AASL laminated lens can be accomplished by use of the technique of molecular beam epitaxy, combined with sophisticated growing methods for crystal compounds production.

After the doped compositional superlattice in the AASL lens is fabricated, it is tuned. The electronic and optical properties of the doped compositional superlattice are designed to have certain values which are modulated over a wide range by weak excitation of the crystal by the absorption and diffraction of the acoustic wave packet. The energy density concentrations and patterns of electrons/holes in the doped compositional superlattice are tunable qualities that can be arranged like fingers extending into the intrinsic (neutral) layer of the superlattice.

The hexagonal groups of triangles of overlapping electrons/holes in the lens can be considered to be a dense pack of expanded spheres. Sphere packing in N-dimensions is methematically applicable to the discrete digital encoding of information on many media. Such quantization allows discrimination amoung transmitted bits leading to conservation of required power by "rounding off" continuously varying quantities.

The triangular array of overlapping holes in the AASL lens therefore functions as an automatic analog to digital converter, or quantizer. Quantization is initiated in two dimensions and then is subsequently carried out in three or more physical dimensions (as well as along a coordinate axis) in a cuboctahedral computer control range.

Any charge point in the AASL lens plane is converted to one of the quantizing charge points, compressing input charge data; an indexing number for the quantizing charge point being transmitted instead of the coordinate values of the charge data point. All charge data points are controlled by computer input in binary code fashion (H).

In planar (2-D) representation, the longitudinal ("z") axis is divided into equal segments (unit length of the base for an equilateral triangle) with the quantizing points being on the midpoints on the unit line segments.

Figure 9:
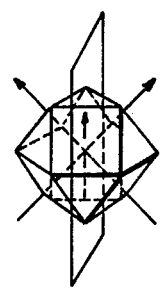
FIG. 9 illustrates the cuboctahedron physical structure of the atomic lattice layers.

The overlapping layers of electrons/holes are represented by the computer by using the hexagonal closest packing (or overlapping circular dense pack) with the hexagons broken down into six unit equilateral triangles. The circular density of packing of any and all unit triangles throughout the planes of control (atomic lattice layers of varying N+1 thicknesses; N=one representative of the atom's diameter). All hexagons/circles in 2-D, cuboctahedrons/spheres in 3-D are interchangable through the 24 N-dimensional Leech lattice using conventional rigid rotations and reflections. (See FIG. 9). This relates to the physical structure of the twenty-four plus overlapping equilateral triangular structures in the laminated mini-bands in the AASL lens (and in the exteriorly charged laminated cavity), as we want to leave the central sphere (charged data point zone) fixed and permute the surrounding spheres (charge data point zones).

Multiple-array trinary phase conjugate steering varies spatial orientation of projected interference patterns on the projected buckets and the acoustically charged surface wave (Rayleigh) patterns on the surface, for variable positioning of lase/charges. Our "steering" system is a generating vertex at the center of the hexagon in a close-packed array in two-dimensions and is simultaneously a three-way joint produced by three spheres overlapping and interacting from around a central point (120 degrees) in three dimensions. The center hexagon or primitive cell involved in the individual $\frac{1}{3}$ sections, which relates to the center of mass, can be shifted by RF projection/manipulation.

The dense pack of overlapping spherical zones is the ideal framework for the dynamics of digitally quantizing every point or hole in the AASL lens (or exteriorly charged laminated cavity) for total aggregate computer control of interactions in a chemical nuclear bonding fashion.

Photons of energy less than the band gap energy (variable), propagate unattenuated through the crystal lattice (lens). The regions of positive charge (holes) behave much as do real particles in their interactions and "transfer-transmission rates" through the trinary encodement (AASL) lens (C).

The exciton and the soliton are key elements in the semiconductor lattices and the projected confined beam components. (See "Solitons", C. Rebbi, Scientific American, Feb. 1971, p. 92 et seq, for a discussion of solitons). The ordered coherent motions of pairs of bound excitons (as well as Cooper pair phononic bonding/modulation) is coherent over macroscopic distances and so are the excitonic (and biexcitonic) orbital states.

Excitonic and other quasi-particulate bonding and Cooper pair bonding can range over many spacings of their respective lattices (A).

Excitons must be in motion within a crystal allowing the establishment of a thermal equilibrium with the lattice atoms in the crystal lens by exchanging kinetic energy with the vibrational energy of the lattice; intricate modulation being transferred in the process. Excitons are highly mobile and may be easily parametrized in a number of ways (A).

Excitons are bosons (spin one quanta) made of bound state Fermionic (e− and 0+) spin one/half quanta components and tend to aggregately fill up quantum band states of lowest energy. A Bose-Einstein condensate is allowable if the bosonic concentration exceeds a critical value which is temperature and mass/momentum dependent.

All particles added to the condensate will condense into a unitary state of minimum energy (A).

Aligning the spins magnetically in the moving buckets (moving charge), will create a high density excitonic gas. The projected buckets with the parallel transport (fiber bundles) alignment of confined coherent excitons create a very dense (macroscopically observable superconductive state) plasma. A phase conjugate mirror signal phase representation is also be installed into the lattice structure by tuning the crystal semiconductor lattice.

The Pi-mode spoke pattern representation and sizing is considered in the design of the three support bars with circular frame, that attach congruently for a smooth surface (in relationship to the cavity structure). The AASL lens support bars may be made of laminated steel alloy with an electro-polished layer of pure Niobium for the exterior coat.

The nanoseconds involved in computer timing is the ratio of lens thickness to time and formulation of charges to laser activation. The superposition of the two dimentional shock wave over the lasing surface and the precise clocking of EM pulsing are important.

The creation and control of charged and neutral, integral and fractional particle interference wave patterns and these patterns association with complex photon field interference patterns, produces the desired specific local variations (computer controlled) in the index of refraction of the projected beam components necessary for the generation and confinement of radiation signals into spin-one quanta: excitons, vector bosons, quasons (quasi-particle bosons, etc.) and for the interstitial (off-vertex) production of closed Wilson loop (frustrated) plaquettes, (as in the terminology of gauge lattice modeling theory, Rubia, Kogitz, Rebbi, Salaam, Ward, t'Hooft, Wilson) with computer controlled odd-numbered precessing frustrations (half-twists).

The allowed energy levels in hydrogen (excitons assume hydrogen role) may be considered to result from constructive interference from a left-right composite circulating wave (deBroglie representation, Davidson/Germer electron microscopy). Advantage is taken of these wave patterns as well as standing RF Pi-mode spoke patterns in order to set up specific resonant modes in space and to produce interferometry-like effects (RF version of transphasor optical device) with a variable index of refraction, in order to get the most efficient use of energies generated initially by a power plant and by the proper phasing of these non-photonic components of the projected beam (J).

In terms of photons, part of what is necessary to accomplish can be stated in an analogous manner as being the generation and control of an EM vertex of zones of photon-quasiparticle, photon-electron and photon interactions with variable reflective/refractive properties similar to a rotating cylindrical lattice of Fabry-Perot cavities (in vast numbers/seconds) possessing transphasor-digital (optical/binary computing system-Hysteresis loop approach) properties. This includes controllable indices of refraction, in order to produce complex binary coded sequences of threefrequency photon patterns with specific phase relationships (through delay mechanisms in the beam) and polarization states, etc.

Trapping the photons in effective potential wells (and their interaction with other beam components) enables the practical utilization of the behavior of particles which have been localized to a small region of space.

While the invention has been disclosed with reference to a limited number of embodiments thereof, it will be apparent that many variations and modifications may be made therein, and it is therefore intended in the following claims to cover each such variation and modification as falls within the true spirit and scope of the invention.

APPENDIX A

This appendix is a list of reference numerals that refer to the references of Appendix B.

(A) Excitons, Bi-Excitonic Gases:
   8, 16, 132, 186, 208, 217, 228, 236, 237, 263, 264, 273, 277, 278, 280, 316, 331, 356–358, 360, 397, 403–405, 410–413, 421, 431, 439, 440, 449, 495, 496, 498, 515, 563, 565, 566, 574, 575.

(B) Buckets:
   48, 49, 153–156, 246, 444.

(C) Crystals and AASL Lens Structure:
   1–6, 24, 25, 41–43, 65, 77, 99, 100, 123, 125, 183, 190, 191, 237, 277, 279, 299, 302, 304, 310, 311, 320, 376, 377, 390, 422, 436–438, 444, 454, 471, 507, 518, 541, 568, 576, 577, 615, 644, 646, 649.

(D) Acoustic Wave Packets:
   18, 41–43, 75, 92, 112, 143, 249, 300, 303, 400, 444, 525–528, 553, 585, 611, 613, 627, 654.

(E) Quantum Electrodynamics (Q.E.D.) Field Vectors
   87, 342, 343, 479, 493, 494, 498, 522, 554.

(F) Superconducting (Hull) Structures:
   32, 42, 53, 57, 63, 65, 68, 69, 76, 78, 84, 87, 88, 99, 123, 125, 152, 166, 184, 190–193, 215, 237, 256, 264–266, 269, 270, 277, 299, 309, 312, 317, 318, 320, 357, 367–370, 379, 380, 389, 390, 396, 407, 413, 447, 451, 478, 482, 483, 490, 491, 492, 518, 519, 522, 530, 581, 584, 602, 614.

(G) RF Triangular Mobile Information Carrying Structure:
   18, 19, 41–43, 49, 57, 64, 87, 88, 92, 246, 273, 277, 286, 287, 331, 342–344, 376, 395, 396, 435, 444, 491, 522, 554, 556–564, 585, 623.

(H) Computer Simulation:
   9, 64, 71, 99, 100, 108, 111, 113, 123, 141, 150, 166, 184, 185, 207, 213, 214, 228, 236, 238–240, 256, 261, 267, 268, 274, 285, 286, 309, 317, 318, 372, 379, 390, 397, 417, 429, 451, 478, 493, 494, 497, 498, 508, 515, 538, 556, 564, 582, 596, 623, 629, 652.

(I) Confinement of Radiation Signals For Intermediate Vector Boson (I.V.B.) Production:
   57, 71, 72, 110–112, 123, 143, 156, 162, 210, 259–261, 432, 498, 553, 554, 556, 564, 633, 634.

(J) Microwave Semiconductor Devices:
   25, 51, 61, 67, 75, 77, 92, 93, 112, 113, 132, 169, 170–172, 189, 192, 215, 237, 273, 275, 276–278, 285, 292, 304, 319–322, 346, 349, 387, 390, 395, 396, 424, 425, 436, 440, 442, 448, 462, 470, 495, 502, 509, 512, 530, 554, 568, 569, 587, 611.

We claim:

1. A laser, comprising:
a semiconductive lens;
a cavity; and
an excitation source;
said lens comprising a paraboloidical/ellipsoidal curved RF photon transparent element having a periodic superlattice of laminated layers of n-doped CdS with lithium reinforcement in the valence band, a periodic superlattice of laminated layers of p-doped CdTe, and an intermediate intrinsic layer of neutral CdS, said lens being separated into three sectors of equal area tuned to emit red, green and blue light in their respective sector;
said lens being mounted, at one end of said cavity;
said excitation source being mounted within said cavity and comprising a source of a spiralling acoustic microwave beam directed toward said lens;
whereby said lens is accoustically activated by said spiralling beam and produces spiralling red, green and blue beams travelling at different phase velocities to recombine to produce a single elliptically polarized white beam at one ellipse per cycle.

2. The laser of claim 1 wherein said source of an acoustic microwave beam comprises a phase locked pi-deBroglie mode RF magnetron.

3. The laser of claim 2 wherein said magnetron produces a chirped acoustic shock wave packet that spreads out in a paraboloidical curved shape focused directly at said lens.

4. The laser of claim 1 wherein said periodic superlattices of laminated layers comprise digital finger arrays geometrically placed in said lens for optimum ponderomotive phase space confinement representation of the zero degree angular excess cap and cone topology.

5. The laser of claim 1 wherein said cavity has an anti-cavitation end piece structure on the end thereof away from said lens.

6. The laser of claim 5 wherein said lens has a substantially circular periphery with said sectors being equal 120 degree sectors thereof, said sectors being separated by equal supportive partitions, said partitions being smooth, congruent and continuous extentions of said cavity, and being joined in the center of said lens, said partitions being comprised of the same material as said cavity end piece and comprising an active part of said cavity.

7. The laser of claim 6 wherein said cavity, said end piece, and said supportive lens partitions comprise an exteriorly charged superconductive laminate of doped periodically arrayed mini-band layers of different metals with an external layer of niobium on a titanium-steel alloy substrate which includes piezoelectric and semiconducting diode elements implanted in an equally triangular array in said cavity, said diode elements being electrically connected such that any and all possible sequences and combinations of said piezoelectric and semiconducting diode elements may be accessed and operated by a control computer, whereby electromagnetic fields are produced to completely shield the laser from exterior electromagnetic interference.

8. The laser of claim 7 wherein different metals includes indium.

9. The laser of claim 7 wherein said different metals includes copper.

10. The laser of claim 1 wherein said lens has a substantially circular periphery, and said sectors are equal 120 degree sectors thereof.

* * * * *